(12) United States Patent
Okami et al.

(10) Patent No.: US 9,918,483 B2
(45) Date of Patent: Mar. 20, 2018

(54) SHEET FOR PACKAGING EDIBLE MEAT, AND CASING FOR PACKAGING EDIBLE MEAT

(71) Applicant: OCI CO., LTD., Kobe-shi (JP)

(72) Inventors: Takeo Okami, Kobe (JP); Hajime Itoshiro, Kobe (JP); Yasuhiko Ogi, Mino (JP); Hidekazu Kito, Seki (JP)

(73) Assignee: OCI CO., LTD., Kobe-shi (JP)

( * ) Notice: Subject to any disclaimer, the term of this patent is extended or adjusted under 35 U.S.C. 154(b) by 782 days.

(21) Appl. No.: 14/375,286

(22) PCT Filed: May 23, 2013

(86) PCT No.: PCT/JP2013/064390
§ 371 (c)(1),
(2) Date: Jul. 29, 2014

(87) PCT Pub. No.: WO2013/183456
PCT Pub. Date: Dec. 12, 2013

(65) Prior Publication Data
US 2015/0004386 A1 Jan. 1, 2015

(30) Foreign Application Priority Data
Jun. 5, 2012 (JP) .................. 2012-128189

(51) Int. Cl.
*B65D 65/40* (2006.01)
*A22C 13/00* (2006.01)
(Continued)

(52) U.S. Cl.
CPC .......... *A22C 13/0013* (2013.01); *A22C 13/00* (2013.01); *B32B 5/022* (2013.01); *B32B 5/26* (2013.01); *D04H 1/4382* (2013.01); *D04H 1/541* (2013.01); *D04H 1/559* (2013.01); *D04H 3/147* (2013.01); *A22C 2013/0053* (2013.01); *A22C 2013/0059* (2013.01); *A22C 2013/0093* (2013.01); *B32B 2250/02* (2013.01); *B32B 2262/0253* (2013.01); *B32B 2262/0276* (2013.01); *B32B 2262/12* (2013.01); *B32B 2307/54* (2013.01); *B32B 2307/718* (2013.01); *B32B 2439/70* (2013.01); *Y10T 442/608* (2015.04); *Y10T 442/641* (2015.04)

(58) Field of Classification Search
CPC ............ Y10T 442/697; Y10T 442/615; Y10T 442/698; Y10T 428/2929; Y10T 442/641; Y10T 442/66; Y10T 428/1324; Y10T 442/60; Y10T 428/24322; Y10T 428/249921; Y10T 428/13; Y10T 428/1334; Y10T 428/1362; Y10T 428/24603; Y10T 428/24612; Y10T 442/601; Y10T 442/602; Y10T 442/608; Y10T 442/614; Y10T 442/681; Y10T 442/692; D04H 1/54; D04H 3/14; D04H 1/4382; D04H 1/541; D04H 1/559; D04H 3/147; D04H 13/00; D04H 1/42; D04H 1/435; D04H 1/4391; D04H 1/65; B32B 5/26; B32B 27/12; B32B 5/022; B32B 27/08; B32B 27/32; B32B 27/36; B32B 2305/20; B32B 2439/70; B32B 5/08; B32B 2250/02; B32B 2262/0253; B32B 2262/0276; B32B 2262/12; B32B 2262/14; B32B 2307/718; B32B 2439/06; B32B 2307/54; A22C 13/00; A22C 13/0013; A22C 2013/0053; A22C 2013/0059; A22C 2013/0093
USPC ............ 426/105, 138, 129, 106; 138/118.1; 206/802; 428/34.9, 34.8, 36.91, 36.9; 442/364, 327, 191, 200, 199, 311, 361, 442/334; 220/660
See application file for complete search history.

(56) References Cited

U.S. PATENT DOCUMENTS 4,292,360 A * 9/1981 Riedel .................. B32B 5/26
156/278
4,496,583 A * 1/1985 Yamamoto ............ D21H 13/24
162/157.3
(Continued)

FOREIGN PATENT DOCUMENTS

JP 04-253653 9/1992
JP 04253654 A1 * 9/1992
(Continued)

OTHER PUBLICATIONS

International Preliminary Report on Patentability for PCT/JP2013/064390, dated Dec. 9, 2014, 5 pages.
European Search Report dated Feb. 12, 2016, 5 pages.

*Primary Examiner* — Lee E Sanderson
*Assistant Examiner* — Julius Fitzhugh
(74) *Attorney, Agent, or Firm* — Marsh Fischmann & Breyfogle LLP; Jonathon A. Szumny

(57) ABSTRACT

A sheet for packaging edible meat is provided that includes a layer A and a layer B thermally adhered to each other. In the sheet, the layer A is a wet-laid nonwoven fabric produced by mixing a first core-in-sheath fiber (a) having a core made of polyester and a sheath made of polyethylene, a second core-sheath fiber (b) having a core made of polyester and a sheath made of a low-melting-point polyester, and an ultrafine polyester fiber (c). The layer B is a spunbonded nonwoven fabric produced from a third core-sheath fiber having a core made of polyester and a sheath made of polyethylene. Also a casing for packaging edible meat is provided that is formed from the sheet for packaging edible meat.

6 Claims, No Drawings

(51) Int. Cl.
    *B32B 5/26*      (2006.01)
    *D04H 1/4382*   (2012.01)
    *D04H 3/147*    (2012.01)
    *D04H 1/559*    (2012.01)
    *B32B 5/02*      (2006.01)
    *D04H 1/541*    (2012.01)

(56) References Cited

U.S. PATENT DOCUMENTS

| | | | |
|---|---|---|---|
| 5,167,764 A * | 12/1992 | Nielsen | D01F 8/06 |
| | | | 162/146 |
| 5,269,994 A * | 12/1993 | Deffenbaugh | B29C 43/22 |
| | | | 156/269 |
| 5,393,599 A * | 2/1995 | Quantrille | B32B 5/26 |
| | | | 156/163 |
| 5,456,982 A * | 10/1995 | Hansen | D01F 8/06 |
| | | | 264/148 |
| 5,631,073 A * | 5/1997 | Riedel | C09J 7/04 |
| | | | 442/364 |
| 6,368,609 B1 * | 4/2002 | Fontenot | B32B 5/08 |
| | | | 424/402 |
| 6,383,958 B1 * | 5/2002 | Swanson | A61F 13/0269 |
| | | | 428/141 |
| 2003/0049988 A1 * | 3/2003 | Ortega | D04H 3/00 |
| | | | 442/334 |
| 2008/0020105 A1 * | 1/2008 | Rieser | A22C 13/0013 |
| | | | 426/129 |
| 2009/0155556 A1 | 6/2009 | Yasumitsu et al. | |
| 2010/0150479 A1 | 6/2010 | Smith | |

FOREIGN PATENT DOCUMENTS

| | | |
|---|---|---|
| JP | 06-153772 | 6/1994 |
| JP | 06-248595 | 9/1994 |
| JP | 06-312494 | 11/1994 |
| JP | 10-018183 | 1/1998 |
| JP | 2003-237826 | 8/2003 |

* cited by examiner

SHEET FOR PACKAGING EDIBLE MEAT, AND CASING FOR PACKAGING EDIBLE MEAT

FIELD OF THE INVENTION

The present invention relates to a sheet for packaging edible meat and a casing for packaging edible meat.

BACKGROUND OF THE INVENTION

A sheet for packaging so-called edible meat such as ham, sausage and fish paste products is generally processed as follows. First, the sheet is cut to a predetermined size. Next, the edges of the cut sheet are heat-sealed to each other to form a tubular casing. Subsequently, one open end (tip end) of the casing is sealed with a clip or the like to form a bag-like shape. Edible meat is packed in the casing, then the other open end (base end) is sealed with a clip, and thus the casing is hermetically sealed in a state of the casing with edible meat packed therein.

For the purpose of successfully performing the above-described operation, the sheet for packaging edible meat and the casing for packaging edible meat formed in a tubular shape by using the sheet are required to have a sufficient strength to withstand the packing pressure so that the sheet and the casing is not broken or torn (hereinafter, referred to as "ruptured") at the time of packing edible meat.

In the production of, for example, ham or salami, edible meat is packed in a casing, and then processed or allowed to age in a state of being suspended with a hook or the like. In such a case, even when the internal pressure of the casing is uniform at the time of packing edible meat, the edible meat is moved downward by its own weight as the time elapses to increase the internal pressure in the lower part of the casing. Consequently, the lower part of the casing sometimes expands because of being unable to withstand the increase of the internal pressure.

Accordingly, in Patent Document 1, the present applicant has proposed a casing paper (sheet) for packaging edible meat, solving the above-described problems. The sheet described in Patent Document 1 is formed of a copolymerized polyester composite fiber and a hydrophilic fiber without using viscose, and is designed for a pressure of packing edible meat ranging from 1.4 to 2.8 kg/cm$^2$.

PRIOR ART DOCUMENTS

Patent Documents

Patent Document 1: Japanese Patent No. 3142677

SUMMARY OF THE INVENTION

Recently, for the purpose of improving productivity, a sheet for packaging edible meat and a casing for packaging edible meat (hereinafter, in the present description, also collectively referred to as a "packaging material") capable of withstanding a higher packing pressure, specifically, a high packing pressure of 3 kg/cm$^2$ or more have been required. A packaging material capable of being used for such a high-pressure packing is required not to be ruptured by the pressure at the time of packing edible meat.

In particular, when an end of the casing is sealed with a clip after packing edible meat, the internal pressure in the portion surrounding the portion sealed with a clip comes to be high temporarily, and the packaging material in the portion concerned tends to be ruptured. Accordingly, the packaging material is required not to be ruptured at the time of sealing with a clip.

Additionally, the weight of the edible meat packed by high pressure packing is increased, and hence the problem of the expansion of the lower part of the casing for packaging edible meat becomes more conspicuous.

The packaging material is peeled off (subjected to so-called peeling) from the edible meat after the processing of the product. However, when the packing pressure is increased, the adhesion between the edible meat and the packaging material comes to be higher. Hence, there also occurs a peeling property-related problem that the packaging material is hard to peel off from the edible meat, or the edible meat adheres to the peeled packaging material.

Accordingly, it is an objective of the present invention to provide a sheet for packaging edible meat and a casing for packaging edible meat suitable for packing edible meat at a higher pressure.

To achieve the foregoing objective and in accordance with one aspect of the present invention, a sheet for packaging edible meat is provided that includes a layer A and a layer B thermally adhered to each other, in which the layer A is a wet-laid nonwoven fabric produced by mixing a first core-sheath fiber (a) having a core made of polyester and a sheath made of polyethylene, a second core-sheath fiber (b) having a core made of polyester and a sheath made of a low-melting-point polyester, and an ultrafine polyester fiber (c). The layer B is a spunbonded nonwoven fabric formed of a third core-sheath fiber having a core made of polyester and a sheath made of polyethylene.

The melting point of the low-melting-point polyester of the fiber (b) is preferably 110° C. or higher and lower than 140° C.

The thickness of the fiber (c) is preferably 0.11 to 0.55 decitex (dtx).

The basis weight of the sheet for packaging edible meat is preferably 25 to 90 g/m$^2$.

The toughness value of the sheet for packaging edible meat determined by the following formula is preferably 150 or more and 400 or less:

$$\text{Toughness value} = |\text{tensile strength}(N/15 \text{ mm}) \times \text{elongation} (\%)/2|$$

Also, a casing for packaging edible meat is provided, in which the casing is tubular and formed of the above described sheet for packaging edible meat, and the layer A is arranged on the inside.

According to the present invention, it is possible to provide a sheet for packaging edible meat and a casing for packaging edible meat, suitable for packing edible meat at a higher pressure.

DETAILED DESCRIPTION OF THE PREFERRED EMBODIMENTS

Hereinafter, a sheet for packaging edible meat, a casing for packaging edible meat and an edible meat packaging operation using the sheet and the casing according to one embodiment will be described. The sheet for packaging edible meat has a form of a planar sheet, and the casing for packaging edible meat means a tube formed of the sheet for packaging edible meat.

<Constitution of Sheet for Packaging Edible Meat>

The sheet for packaging edible meat (hereinafter, simply referred to as a "sheet") of the present embodiment has a multilayer structure. Specifically, the sheet includes a layer A and a layer B that are thermally adhered to each other.

The layer A is a wet-laid nonwoven fabric. The layer A is produced as follows. Three types of fibers (a), (b) and (c) are mixed with each bother. Then, from the resulting mixture, the layer A is formed in a sheet shape by using a paper machine.

The fiber (a) is a first core-sheath fiber including a core made of polyester and a sheath made of polyethylene. When the fiber (a) is heated at 140 to 190° C., the core section is not melted, but the sheath section is melted to exhibit adhesion property. Accordingly, when the layer A and the layer B are laminated on each other and are thermally adhered to each other, the fiber (a) can be satisfactorily adhered to the fiber constituting the layer B while maintaining the function as a fiber. The thickness of the fiber (a) is preferably 0.55 to 5.5 dtx, and the length of the fiber (a) is preferably about 2 to 12 mm. The content of the fiber (a) in the layer A is preferably 15% by mass to 60% by mass. Specific examples of the fiber (a) include: "Melty (registered trademark)" manufactured by Unitika Ltd.; "NBF (registered trademark) (SH)" manufactured by Daiwabo Polytec Co., Ltd.; and "ETC" manufactured by JNC Corp.

The fiber (b) is a second core-sheath fiber including a core made of polyester and a sheath made of a low-melting-point polyester. The fiber (b) is used for the purpose of maintaining the strength of the entire layer A. At the time of the thermal adhesion, the polyester in the core section of the fiber (b) is not melted, but the low-melting-point polyester in the sheath section of the fiber (b) is melted to allow the fibers to adhere to each other. The low-melting-point polyester is required to have a melting point equal to or lower than the heating temperature at the time of the thermal adhesion. The melting point of the low-melting-point polyester is preferably 110° C. or higher and lower than 140° C. The thickness of the fiber (b) is preferably 0.55 to 5.5 dtx, and the length of the fiber (b) is preferably about 2 to 12 mm. The content of the fiber (b) in the layer A is preferably falls within a range from 20% by mass to 80% by mass. Specific examples of the fiber (b) include: "Soffit (registered trademark) N720, N721" manufactured by Kuraray Co., Ltd.; "Melty (registered trademark) 3880" and "Melty (registered trademark) 4080" manufactured by Unitika Ltd.; and "TJ04CN" manufactured by Teijin Ltd.

The fiber (c) is an ultrafine polyester fiber. The fiber (c) entangles the fibers with each other when the fiber material constituting the layer A is processed with a paper machine, and thus allows the fiber material to move on the felts and between the felts of the paper machine. Accordingly, the thickness of the fiber (c) is preferably 0.11 to 0.55 dtx, and the length of the fiber (c) is preferably about 2 to 5 mm. The content of the fiber (c) in the layer A preferably falls within a range from 5% by mass to 20% by mass. Specific examples of the fiber (c) include "TA04PN" manufactured by Teijin Ltd.

The paper machine used in the production of the layer A may be a paper machine generally used for production of paper. For example, a cylinder machine, a tanmo machine and a Fourdrinier machine can be used.

The layer B is a spunbonded nonwoven fabric formed of a third core-sheath fiber including a core made of polyester and a sheath made of polyethylene. The third core-sheath fiber may be the same as or different from the first core-sheath fiber used as the fiber (a) of the layer A. Specific examples of the spunbonded nonwoven fabric usable for the layer B include "Elves (registered trademark)" manufactured by Unitika Ltd.

By forming the casing for packaging edible meat (hereinafter, simply referred to as a "casing") from a sheet formed by laminating the layer A and the layer B on each other, it is possible to obtain a strength sufficient not to cause the rupture of the casing at the time of packing edible meat or at the time of the subsequent sealing with a clip. In contrast, when the casing is formed of a single layer sheet composed only of the layer A, the strength of the casing is insufficient. Alternatively, when the casing is formed of a single layer sheet composed only of the layer B, the spunbonded nonwoven fabric constituting the layer B tends to be stretched, and hence while the casing packed with edible meat is being suspended, the casing may be deformed by the pressure exerted by the edible meat having moved downward.

The basis weight of the entire sheet as a combination of the layer A and the layer B is preferably 25 to 90 g/m². In this case, the heat sealing processing of the sheet can be easily performed. Additionally, the casing and the packed edible meat can be sufficiently adhered to each other.

As far as the basis weights of the respective layers are concerned, the basis weight of the layer A is preferably 10 to 40 g/m², and the basis weight of the layer B is preferably 15 to 50 g/m².

Toughness is one of the evaluation standards of the sheet suitable for the high pressure packing of edible meat. The toughness value is calculated by the following formula.

$$\text{Toughness Value} = |\text{tensile strength}(N/15\text{ mm}) \times \text{elongation (\%)}/2|$$

In other words, in the present invention, the toughness of a sheet is determined in consideration of the tensile strength and the elongation of the sheet. This is because the deformation (mainly due to the large elongation of the sheet) of the casing after packing edible meat cannot be evaluated only by the tensile strength, and the rupture (mainly due to the small tensile strength of the sheet) of the casing at the time of packing edible meat or at the time of sealing with a clip cannot be evaluated only by the elongation.

The toughness value is preferably 150 or more and 400 or less. When the toughness value falls within the above-described range, rupture of the sheet at the time of packing edible meat or at the time of sealing with a clip, and deformation of the casing after packing edible meat are prevented in a favorable manner. The tensile strength and the elongation are the numerical values in the widthwise direction of the sheet, namely, the direction perpendicular to the paper making direction (corresponding to the widthwise direction or the circumferential direction in the casing), and mean the values measured according to Japanese Industrial Standard (JIS) P8113.

<Production of Sheet>

A sheet is formed by laminating the layer A and the layer B on each other in the thickness direction and then heating the resulting laminate. The heating can be performed by using, for example, a heat roller. By passing the layer A and the layer B through the heat roller in a state of being laminated on each other, the polyethylene and the low-melting-point polyester included in the layer A and the polyethylene included in the layer B are melted, and the respective fibers adhere to each other. Consequently, the layer A and the layer B adhere to each other to form an integrated sheet. The heat roller is preferably operated in a surface temperature range of 140 to 190° C., a linear pressure range of 3 to 40 kgf/cm, and a process speed range of 10 to 30 m/min. Either of the layer A and the layer B may be brought into contact with the heat roller. The sheet formed by the thermal processing may be taken up around a winding roller.

<Additional Processing of Sheet>

In order to improve the exterior appearance and the savor of a product, an additional processing to attach to a sheet a colorant, a flavor, a spice and the like may also be performed. The additional processing is performed after the formation of the sheet and before the formation of the casing. When the layer A forms the inside surface of the casing, namely when the layer A is brought into contact with edible meat, a dye, a flavor or the like is attached to the surface of the layer A. If necessary, a printing processing such as transferring may be performed on the surface of the layer A. When the casing is plain, the layer B may form the inside surface of the casing.

<Production of Casing>

Successively, the sheet is formed into a tubular casing. Specifically, both sides, extending in the longitudinal direction, of a sheet lengthy in the paper making direction are sealed to each other with a heat sealer to form a continuous tubular casing. Specific examples of the sealing includes a method in which the sealing is performed by superposing on each other the insides surfaces of both sides of a sheet (method I), and a method in which the sealing is performed by superposing on each other the inside surface of one side of a sheet and the outside surface of the other side of the sheet (method II). In other words, in the method I, when the layer A is arranged on the inside, the layer A is sealed to the layer A. In the method II, the layer A and the layer B are sealed to each other. The adhesion portion formed by the sealing may be continuous, or may take a discontinuous form such as a dot-like form. The widthwise length of the adhesion portion is preferably selected within a range from 3 to 15 mm, depending on, for example, the diameter of the formed casing. The heat sealer is preferably operated within a temperature range from 150 to 230° C., a sealing pressure range from 3.0 to 6.5 kgf/cm², and a sealing time range from 0.3 to 0.6 second.

<Packing of Edible Meat and Sealing>

Edible meat is packed in the produced casing, and then the casing is sealed. In general, for packing edible meat, an edible meat packing machine is used. The edible meat packing machine is provided with a packing pipe equipped with a discharge nozzle for discharging edible meat. After the discharge pipe is covered with a casing, edible meat is discharged from the discharge nozzle to continuously pack the edible meat in the inside of the casing. Edible meat is packed in the casing until a predetermined packing pressure is reached, and then the base end of the casing is squeezed and sealed with a clip. In this case, by sealing with two clips (so-called double clip sealing) two positions of the base end of the casing, the casing finished with the edible meat packing is sealed, and at the same time, the tip end of the successive casing in which edible meat is successively packed can be sealed.

The edible meat packed and sealed in the casing is subjected to necessary steps such as drying, smoking and aging, depending on the uses as, for example, ham, sausage and salami.

Next, the sheet and the casing of the present invention will be described specifically with reference to Examples.

Example 1

As the fiber (a), the fiber (b), and the fiber (c) of the layer A, Melty (registered trademark) 6080 (2.2 dtx×5 mm) manufactured by Unitika Ltd., Soffit (registered trademark) N720 (2.2 dtx×5 mm) manufactured by Kuraray Co., Ltd. and TA04PN (0.1 dtx×3 mm) manufactured by Teijin Ltd. were used, respectively. These fibers were mixed with a mass ratio of fiber (a):fiber (b):fiber (c)=30:65:5, and a wet-laid nonwoven fabric having a basis weight of 21 g/m² was produced by using a cylinder paper machine. As the layer B, a nonwoven fabric sheet (Elves (registered trademark) T0203WDO, manufactured by Unitika Ltd.) having a basis weight of 20 g/m² was used.

Next, the layer A and the layer B were laminated on each other, and the resulting laminate was heated with the layer B up under the conditions of a temperature of 185° C., a linear pressure of 3.0 kgf/cm and a process speed of 13 m/min, by using a heat roller. Thus, a sheet in which the layer A and the layer B were integrated, having a basis weight of 41 g/m² was formed.

Example 2

As the layer A, a wet-laid nonwoven fabric having a basis weight 23 g/m² was produced under the same conditions as in Example 1. As the layer B, a nonwoven fabric sheet (Elves (registered trademark) T0303WDO) having a basis weight of 30 g/m² was used. Next, the layer A and the layer B were laminated on each other, and the resulting laminate was heated under the same conditions as in Example 1 by using a heat roller. Thus, a sheet having a basis weight of 53 g/m² was formed.

Example 3

As the layer A, a wet-laid nonwoven fabric having a basis weight 33 g/m² was produced under the same conditions as in Example 1. As the layer B, a nonwoven fabric sheet (Elves (registered trademark) T0203WDO) having a basis weight of 20 g/m² was used. Next, the layer A and the layer B were laminated on each other, and the resulting laminate was heated under the same conditions as in Example 1 by using a heat roller. Thus, a sheet having a basis weight of 53 g/m² was formed.

Example 4

As the layer A, a wet-laid nonwoven fabric having a basis weight 30 g/m² was produced under the same conditions as in Example 1. As the layer B, a nonwoven fabric sheet (Elves (registered trademark) T0303WDO) having a basis weight of 30 g/m² was used. Next, the layer A and the layer B were laminated on each other, and the resulting laminate was heated under the same conditions as in Example 1 by using a heat roller. Thus, a sheet having a basis weight of 60 g/m² was formed.

Example 5

As the layer A, a wet-laid nonwoven fabric having a basis weight 31 g/m² was produced under the same conditions as in Example 1. As the layer B, a nonwoven fabric sheet (Elves (registered trademark) T0153WDO) having a basis weight of 15 g/m² was used. Next, the layer A and the layer B were laminated on each other, and the resulting laminate was heated under the same conditions as in Example 1 by using a heat roller. Thus, a sheet having a basis weight of 46 g/m² was formed.

Example 6

As the fiber (a), the fiber (b) and the fiber (c) of the layer A, Melty (registered trademark) 6080 (2.2 dtx×5 mm)

manufactured by Unitika Ltd., Soffit (registered trademark) N720 (2.2 dtx×5 mm) manufactured by Kuraray Co., Ltd. and TA04PN (0.1 dtx×3 mm) manufactured by Teijin Ltd. were used, respectively. These fibers were mixed with a mass ratio of fiber (a):fiber (b):fiber (c)=45:50:5, and a wet-laid nonwoven fabric having a basis weight of 19 g/m$^2$ was produced by using a cylinder paper machine. As the layer B, a nonwoven fabric sheet (Elves (registered trademark) T0303WDO, manufactured by Unitika Ltd.) having a basis weight of 30 g/m$^2$ was used.

Next, the layer A and the layer B were laminated on each other, and the resulting laminate was heated under the same conditions as in Example 1 by using a heat roller. Thus, a sheet in which the layer A and the layer B were integrated, having a basis weight of 49 g/m$^2$ was formed.

Comparative Example 1

As the layer A, a wet-laid nonwoven fabric having a basis weight 30 g/m$^2$ was produced under the same conditions as in Example 1. The resulting layer A was used as a single layer sheet.

Comparative Example 2

A nonwoven fabric sheet (Elves (registered trademark) T0503WDO, manufactured by Unitika Ltd.) having a basis weight of 50 g/m$^2$ was used as a single layer sheet composed only of the layer B.

Comparative Example 3

A sheet equivalent to Example 1 described in Patent Document 1 was produced. Specifically, a softwood pulp SR20°, Soffit (registered trademark) N720 (2.2 dtx×10 mm) manufactured by Kuraray Co., Ltd. and Soffit (registered trademark) N721 (1.7 dtx×5 mm) manufactured by Kuraray Co., Ltd. were mixed with a mass ratio of 10:25:65, and a wet-laid nonwoven fabric having a basis weight of 56 g/m$^2$ was produced by using a cylinder paper machine. The resulting wet-laid nonwoven fabric was used as a single layer sheet.

For the sheet of each of Examples and Comparative Examples, the tensile strength and the elongation were measured, and the toughness value was calculated. The results thus obtained are shown in Table 1.

TABLE 1

| | Tensile strength (N/15 mm) | Elongation (%) | Toughness |
|---|---|---|---|
| Example 1 | 13.74 | 28.1 | 193 |
| Example 2 | 19.67 | 28.5 | 280 |
| Example 3 | 18.30 | 23.3 | 213 |
| Example 4 | 22.80 | 30.2 | 344 |
| Example 5 | 16.06 | 22.2 | 178 |
| Example 6 | 16.72 | 26.2 | 219 |
| Comparative Example 1 | 4.98 | 18.5 | 46 |
| Comparative Example 2 | 24.75 | 49.1 | 608 |
| Comparative Example 3 | 18.27 | 8.7 | 79 |

* The values of the toughness are each the absolute value of the tensile strength × elongation/2 (rounded to the nearest whole number).

As can be seen from Table 1, in each of all Examples, the toughness value falls within a range of 150 or more and 400 or less. In contrast, in Comparative Example 1, the tensile strength is small; in Comparative Example 2, the elongation is large; and in Comparative Example 3, the elongation is small. Consequently, in any of Comparative Examples 1 to 3, the toughness value falls outside the range of 150 or more and 400 or less.

<Heat Seal Strength Test>

A heat seal strength test of a sheet was performed as follows.

From the sheet of each of Examples, a plurality of sheet pieces each having a predetermined shape were cut out. Sets of two sheet pieces were formed. In one set, the layer A of one sheet piece was superposed on the layer B of the other sheet, and then the two sheets were heat sealed to each other (A-B layer sealing) to prepare a sample. In another set, the layers A of the two sheets were superposed on each other, and then the two sheets were heat sealed (A-A layer sealing) to each other; thus, two different types of sample sets were prepared.

The A-B layer sealing corresponds to the heat sealed portion of the casing (either of the layer A and the layer B may be on the inside) produced by the above-described method II. The A-A layer sealing corresponds to the heat sealed portion of the casing produced by the above-described method I, with the layers A of the sheets arranged on the inside. On the other hand, the sheet of each of all Comparative Examples had a single layer structure, and hence two sheet pieces were laminated on each other without discriminating the outside and the inside, and the resulting laminate was heat sealed (single layer sealing).

The heat sealing was performed under the conditions of a temperature of 220° C., a sealing pressure of 3.5 kgf/cm$^2$ and a sealing time of 0.5 second, with a width of 15 mm in the paper making direction in the same manner as in the production of the casing.

The heat-sealed specimens were each shaped into a rectangle of 15 mm in the paper making direction length×a few centimeters in the direction perpendicular to the paper making direction. The heat-sealed portions were each positioned in the middle of the rectangle.

In order to test the strength of each of the specimens, the tensile strengths in the direction perpendicular to and the direction parallel to the heat-sealed plain were measured.

<Measurement of Tensile Strength in Perpendicular Direction (Perpendicular Method)>

The same side edges of the two heat-sealed sheet pieces (for example, the right side edge of one sheet and the right side edge of the other sheet) were each chucked, the chucked edges were slowly separated from each other, and the load (N/15 mm) at the time of the rupture of the specimen was measured.

<Measurement of Tensile Strength in parallel Direction (Parallel Method)>

The opposite side edges of the two heat-sealed sheet pieces (for example, the right side edge of one sheet and the left side edge of the other sheet) were each chucked, the chucked edges were slowly separated from each other, and the load (N/15 mm) at the time of the rupture of the specimen was measured.

The results thus obtained are shown in Table 2 presented below.

TABLE 2

|  | Perpendicular method | | | Parallel method | | |
| --- | --- | --- | --- | --- | --- | --- |
|  | A-B layer sealing | A-A layer sealing | Single layer sealing | A-B layer sealing | A-A layer sealing | Single layer sealing |
| Example 1 | 2.88 | 8.52 | — | Sheet breakage | Sheet breakage | — |
| Example 2 | 2.01 | 7.98 | — | Sheet breakage | Sheet breakage | — |
| Example 3 | 2.62 | 8.79 | — | Sheet breakage | Sheet breakage | — |
| Example 4 | 1.88 | 9.76 | — | Sheet breakage | Sheet breakage | — |
| Example 5 | 2.26 | Sheet breakage | — | Sheet breakage | Sheet breakage | — |
| Example 6 | 3.90 | 8.66 | — | Sheet breakage | Sheet breakage | — |
| Comparative Example 1 | — | — | Sheet breakage | — | — | Sheet breakage |
| Comparative Example 2 | — | — | 12.79 | — | — | Sheet breakage |
| Comparative Example 3 | — | — | 6.71 | — | — | Sheet breakage |

* "Sheet breakage" means that the sheet piece was ruptured in a portion other than the sealed portion.

<Production of Casing>

A sheet piece having a long length in the paper making direction was obtained by cutting in the paper making direction each of the sheets of Examples and Comparative Examples to have a width of 135 mm. The sheet piece of each of Examples was rolled in a tubular shape so that the layer A was arranged on the inside, and according to the above-described method II, the layer A of the one side and the layer B of the other side were superposed on each other over a width of 15 mm. By using the heat seal bar attached to the Center Press Pouch Making Machine Model HSP-400-SA manufactured by Nishibe Kikai Co., Ltd., the resulting superposed portion was heat-sealed under the conditions of a width of 10 mm, a temperature of 180° C., a sealing pressure of 6.0 kgf/cm$^2$ and a sealing time of 0.55 second, such that the adhesion portion formed by the sealing had a dot-like pattern. By the heat sealing, a casing having a width of 60 mm in a planar state was formed. On the other hand, for each of Comparative Examples, a casing was formed in the same manner as in each of Examples except that the outside and the inside of the sheet were not discriminated.

For the casing of each of Examples and Comparative Examples, the following test was performed.

<Edible Meat Packing Test>

A casing was mounted on an edible meat packing machine, and then edible meat was packed in the casing. Pickling liquid and starch were mixed with pork and lard chopped with a chopper to form a meat paste, and the resulting meat paste was used as edible meat. From a discharge nozzle, the meat paste was discharged into the interior of the casing at a rate of 20 kg/min, and was packed at a packing pressure of 5.0 kgf/cm$^2$ until the total length of the packed meat paste reached 1 m. The occurrence or non-occurrence of the rupture of the casing during packing was evaluated on the basis of "A" or "C." "A" indicates that the casing was not ruptured during packing, and "C" indicates that the casing was ruptured during packing.

<Rupture Test at the Time of Sealing with a Clip>

After packing edible meat in the casing, the end of the casing was squeezed by using a double clipper (FCA3430, manufactured by Poly Clip System Corp.) and sealed with a clip (15-8, 5×1.75, manufactured by Poly Clip System Corp.). The internal pressure of the casing at the time of sealing with a clip was found to be 6 kgf/cm$^2$.

Immediately after the sealing with a clip, the occurrence or non-occurrence of the rupture of the casing in the portion surrounding the portion sealed with a clip was visually examined, and was evaluated on the basis of "A" or "C." "A" indicates that the rupture of the casing was not found, and "C" indicates that the rupture of the casing was found. The casing of Comparative Example 1 was ruptured at the time of packing edible meat, and hence was excluded from the test objects (this is also the case for the following tests).

<Deformation Test of Casing>

A casing packed with edible meat with both ends each sealed with a clip was vertically suspended, heated for 60 minutes under the conditions of 75° C. and a humidity of 99%, and successively dried for 40 minutes under the conditions of 65° C. and a humidity of 15%. After the drying step, while the casing packed with edible meat was being suspended, the edible meat was aged under the conditions of a temperature of 16° C. and a humidity of 85% for 3 weeks to complete salami.

Immediately after the suspension of the casing packed with edible meat and immediately after the completion of the salami, the diameters of the portions separated by 30 cm, respectively, from the upper end and the lower end of the casing (hereinafter, respectively referred to as the "upper portion" and the "lower portion") were measured. Next, the value α was determined by subtracting the diameter of the upper portion from the diameter of the lower portion immediately after the suspension of the casing, and the value of β was determined by subtracting the diameter of the upper portion from the diameter of the lower portion immediately after the completion of the salami. Also, the value γ was determined by subtracting α from β.

From the value γ (namely, the change of the diameter difference of the casing from immediately after the suspension of the casing to immediately after the completion of the salami), the deformation of the casing was evaluated on the basis of "A," "B" or "C." "A" indicates that the value γ was within ±1 mm, "B" indicates that the value γ was within ±2 mm, and "C" indicates that the value γ exceeded ±2 mm.

In Comparative Example 3, edible meat was able to be packed in the casing, but the rupture of the casing occurred in the portion surrounding the portion sealed with a clip. Accordingly, in Comparative Example 3, after packing edible meat, sealing with a clip was performed by manual operation with a pair of pliers, then it was confirmed that no rupture had occurred in the portion surrounding the portion sealed with a clip, and successively the intended test was performed.

<Peeling Property Test>

The ease in peeling of the casing from the completed salami and the degree of adhesion of the edible meat to the peeled casing were evaluated on the basis of "A," "B" or "C." "A" indicates that the casing was easily peeled from the edible meat, and no edible meat was found to adhere to the peeled casing; "B" indicates that the casing was easily peeled off the edible meat, but the edible meat was found to adhere to the peeled casing; and "C" indicates that the casing was hard to peel off the edible meat.

The respective results thus obtained are shown in Table 3 presented below.

TABLE 3

|  | Rupture at the time of packing | Rupture at the time of sealing with a clip | Deformation of casing | Peeling property |
| --- | --- | --- | --- | --- |
| Example 1 | A | A | A | A |
| Example 2 | A | A | A | A |
| Example 3 | A | A | A | A |
| Example 4 | A | A | A | A |
| Example 5 | A | A | A | A |
| Example 6 | A | A | A | A |
| Comparative Example 1 | C | — | — | — |
| Comparative Example 2 | A | A | C | A |
| Comparative Example 3 | A | C | A | C |

As can be seen from these results, the casings using the sheets of Examples 1 to 6 were not ruptured even when edible meat was packed with a packing pressure of 5.0 kgf/cm$^2$, and were not ruptured even at the time of the subsequent sealing with a clip. The casings of Examples 1 to 6 were little deformed even when suspended for a predetermined period of time for salami processing, and resulted in easy peeling from the edible meat. Accordingly, it was revealed that the sheets and the casings of Examples 1 to 6 were suitable for high pressure packing of edible meat. On the other hand, the casing of Comparative Example 1 was ruptured at the time of packing edible meat. The casing of Comparative Example 2 was deformed during the suspension after packing edible meat. The casing of Comparative Example 3 was ruptured at the time of sealing with a clip, and was poor in the peeling property. Accordingly, it was revealed that the sheets and the casings of Comparative Examples 1 to 3 were not suitable for high pressure packing of edible meat.

What is claimed is:

1. A sheet for packaging edible meat comprising a layer A and a layer B thermally adhered to each other, wherein:
    the layer A is a wet-laid nonwoven fabric produced by mixing a first core-sheath fiber (a) having a core made of polyester and a sheath made of polyethylene, a second core-sheath fiber (b) having a core made of polyester and a sheath made of a low-melting-point polyester, and an ultrafine polyester fiber (c),
    the fiber (a) has a length within the range of 2 to 12 mm,
    the fiber (b) has a length within the range of 2 to 12 mm,
    the fiber (c) has a length within the range of 2 to 5 mm, and
    the layer B is a spunbonded nonwoven fabric formed of a third core-sheath fiber having a core made of polyester and a sheath made of polyethylene, and
    wherein the layer A comprises 15% by mass to 60% by mass of the fiber (a), 20% by mass to 80% by mass of the fiber (b), and 5% by mass to 20% by mass of the fiber (c).

2. The sheet for packaging edible meat according to claim 1, wherein the melting point of the low-melting-point polyester of the fiber (b) is 110° C. or higher and lower than 140° C.

3. The sheet for packaging edible meat according to claim 1, wherein the thickness of the fiber (c) is 0.11 to 0.55 decitex (dtx).

4. The sheet for packaging edible meat according to claim 1, wherein the basis weight thereof is 25 to 90 g/m$^2$.

5. The sheet for packaging edible meat according to claim 1, having a toughness value of the sheet for packaging edible meat of 150 or more and 400 or less, wherein the toughness value is determined by the following formula:

Toughness value=|tensile strength($N$/15 mm)×elongation (%)/2|.

6. A casing for packaging edible meat, wherein
    the casing is tubular and formed of the sheet for packaging edible meat according to claim 1, and
    the layer A is arranged on the inside.

* * * * *